United States Patent
Singh et al.

(10) Patent No.: US 12,421,110 B2
(45) Date of Patent: Sep. 23, 2025

(54) CYCLIC METHOD OF PRODUCING A HYDROGEN RICH STREAM AND/OR A CARBON MONOXIDE RICH STREAM

(71) Applicant: Universiteit Gent, Ghent (BE)

(72) Inventors: Varun Singh, Ghent (BE); Vladimir Galvita, Lochristi (BE); Mark Saeys, Zottegem (BE); Guy Marin, Ghent (BE)

(73) Assignee: Universiteit Gent, Ghent (BE)

( * ) Notice: Subject to any disclaimer, the term of this patent is extended or adjusted under 35 U.S.C. 154(b) by 640 days.

(21) Appl. No.: 17/783,013

(22) PCT Filed: Dec. 8, 2020

(86) PCT No.: PCT/EP2020/084999
§ 371 (c)(1),
(2) Date: Jun. 7, 2022

(87) PCT Pub. No.: WO2021/116066
PCT Pub. Date: Jun. 17, 2021

(65) Prior Publication Data
US 2023/0043199 A1    Feb. 9, 2023

(30) Foreign Application Priority Data

Dec. 9, 2019    (EP) .................................... 19214448

(51) Int. Cl.
*C01B 3/06*    (2006.01)
*B01D 53/62*    (2006.01)
(Continued)

(52) U.S. Cl.
CPC .............. *C01B 3/063* (2013.01); *B01D 53/62* (2013.01); *B01D 53/81* (2013.01); *B01J 8/0278* (2013.01);
(Continued)

(58) Field of Classification Search
CPC ......... C01B 3/063; C01B 32/40; B01D 53/62; B01D 53/81; B01D 2251/404;
(Continued)

(56) References Cited

U.S. PATENT DOCUMENTS 9,937,484 B2    4/2018  Liu et al.
2003/0150163 A1*  8/2003  Murata .................... B01J 20/06
                                                         422/204

(Continued)

FOREIGN PATENT DOCUMENTS

EP    0742172 A2    11/1996
FR    2995600 A1    3/2014
RU    2633354 C1    10/2017

OTHER PUBLICATIONS

Database WPI, Week 201777, Thomson Scientific, London, GB; AN 2017-78565W, XP002799172.

*Primary Examiner* — Anthony J Zimmer
*Assistant Examiner* — Abdul-Rahman Yusuf Waleed Smari
(74) *Attorney, Agent, or Firm* — Ipsilon USA—NLO (57) ABSTRACT

The invention relates to a cyclic method of producing a hydrogen rich and/or a carbon monoxide rich stream using different materials, a first solid material, a second solid material and a $CO_2$ sorbent material.
In a first step a first gas stream comprising steam and at least one reductant is brought in contact with the three materials resulting in a hydrogen rich outlet stream.
In a second step, the captured $CO_2$ from the first step is released and converted to CO to produce a CO rich outlet stream.
The invention further relates to an installation for producing a hydrogen rich and/or carbon monoxide rich stream.

12 Claims, 4 Drawing Sheets

Step 2

Step 1

(51) Int. Cl.
  *B01D 53/81* (2006.01)
  *B01J 8/02* (2006.01)
  *B01J 21/04* (2006.01)
  *B01J 23/755* (2006.01)
  *C01B 32/40* (2017.01)

(52) U.S. Cl.
  CPC ............. *B01J 21/04* (2013.01); *B01J 23/755* (2013.01); *C01B 32/40* (2017.08); *B01D 2251/404* (2013.01); *B01D 2251/602* (2013.01); *B01D 2257/504* (2013.01)

(58) Field of Classification Search
  CPC ......... B01D 2251/602; B01D 2257/504; B01J 8/0278; B01J 21/04; B01J 23/755
  See application file for complete search history.

(56) References Cited

U.S. PATENT DOCUMENTS

| | | | |
|---|---|---|---|
| 2012/0230897 A1* | 9/2012 | Abanades Garcia | B01D 53/62 423/230 |
| 2013/0009099 A1 | 1/2013 | Grover | |

* cited by examiner

CYCLIC METHOD OF PRODUCING A HYDROGEN RICH STREAM AND/OR A CARBON MONOXIDE RICH STREAM

FIELD OF THE INVENTION

The present invention relates to a method to produce a hydrogen rich stream, a carbon monoxide rich stream or a combination of a hydrogen rich stream and a carbon monoxide rich stream. The invention further relates to a system to a produce a hydrogen rich stream, to produce a carbon monoxide rich stream or to produce a combination of hydrogen rich stream and a carbon monoxide rich stream.

BACKGROUND ART

Hydrogen appears to be one of the most promising energy carriers because of its potentially high energy efficiency and low generation of pollutants. As hydrogen is not readily available in sufficient quantities there is a need to produce hydrogen gas in a cheap, efficient and sustainable way (preferably with $CO_2$ sequestration or capturing) to allow hydrogen to become a major energy source.

Today, the most widely used technology to produce hydrogen gas is by methane steam reforming, followed by the water gas shift reaction and a final purification step. In a first step methane reacts with steam. This methane reforming process is however an endothermic process requiring high temperatures (usually from 973-1373 K (from 700-1100° C.)), a constant heat supply and results in a mixed carbon monoxide (CO) and hydrogen ($H_2$) stream. In a second step, known as a water gas shift reaction, the carbon monoxide produced in the first step reacts with steam to form hydrogen and carbon dioxide ($CO_2$).

Steam reforming can be improved by using sorption enhancement and chemical looping.

In sorption enhanced steam reforming, the reforming reaction is enhanced by the addition of a solid $CO_2$ sorbent. The $CO_2$ sorbent removes $CO_2$ from the reactor, enhances the purity and enables in situ $CO_2$ capture. However, in sorption enhanced steam reforming $CO_2$ is captured but not utilized in-situ.

In chemical looping steam reforming, an oxygen transfer material (oxygen carrier) is used to oxidize fuel (for example methane) in a first step. The oxygen carrier is then recycled in a second step producing $H_2$.

In sorption-enhanced chemical looping reforming processes the advantages of sorption enhancement and chemical looping are combined. A sorption-enhanced chemical looping reforming is an attractive process as it combines $H_2$ production with $CO_2$ capture. A sorption-enhanced chemical looping reforming process however has the drawback that the captured $CO_2$ is not utilized in situ.

SUMMARY OF THE INVENTION

It is an object of the present invention to provide a method to provide a carbon monoxide rich stream, a hydrogen rich stream or a combination of a carbon monoxide rich stream and a hydrogen rich stream.

It is a further object of the present invention to provide a method to combine $CO_2$ capture and in situ $CO_2$ utilization to produce carbon monoxide that can be used for producing a wide variety of chemicals.

It is another object of the present invention to provide a method that uses heat to release $CO_2$ from a $CO_2$ sorbent material by combining the use of an oxidant (for example air) and a solid material (the first solid material).

Furthermore it is an object of the present invention to provide a cyclic method comprising two steps allowing to avoid deactivation of a solid material (the first solid material) by coking as coke can be removed by the release of $CO_2$ from the $CO_2$ sorbent.

According to a first aspect of the present invention a method of producing a hydrogen rich stream and/or a carbon monoxide rich stream, and preferably a hydrogen rich stream and a carbon monoxide rich stream is provided. The method is a cyclic method comprising a first step and a second step.

The first step comprises introducing a first gas stream to contact a first solid material, a $CO_2$ sorbent material and a second solid material to provide a first outlet stream, preferably comprising a hydrogen rich outlet stream. The first gas stream comprises steam and at least one reductant. The second step comprises introducing a second gas stream to contact the first solid material, the first $CO_2$ sorbent material and the second solid material to provide a second outlet stream, preferably comprising a carbon monoxide rich stream. The second gas comprises at least one oxidant, for example air.

The first solid material has a first thermodynamic equilibrium oxygen partial pressure referred to as $p1_{O_2,eq}$ and the second solid material has a second thermodynamic equilibrium oxygen partial pressure referred to as $p2_{O_2,eq}$. Preferably, at the process conditions of the first step and at the process conditions of the second step, the first thermodynamic equilibrium oxygen partial pressure $p1_{O_2,eq}$ is larger than the second thermodynamic equilibrium oxygen partial pressure $p2_{O_2,eq}$. The method according to the present invention is furthermore characterized in that the first solid material comprises a steam reforming catalyst, i.e. a material catalysing the steam reforming reaction, the reaction of the at least one reductant with steam to form syngas;

the first solid material oxidizes the at least one reductant of the first gas stream in the first step and under the process conditions of the first step to form syngas;

the first solid material is oxidized, preferably (nearly) irreversibly oxidized, by the at least one oxidant while not being oxidized by $CO_2$ in the second step and under the process conditions of the second step;

the $CO_2$ sorbent material is capturing $CO_2$ in the first step under the process conditions of the first step;

the $CO_2$ sorbent material is releasing $CO_2$, preferably the $CO_2$ captured in the first step, in the second step and under the process conditions of the second step;

the second solid material is reduced by syngas in the first step and under the process conditions of the first step; and the second solid material is oxidized by $CO_2$ in the second step and under the conditions of the second step to form CO.

The process conditions of the first step of the method according to the present invention comprise preferably a temperature ranging between 573 and 1473 K (300 and 1200° C.) and a pressure ranging between 0.1 and 100 bar. More preferably, the process conditions of the first step of the method according to the present invention comprise a temperature ranging between 773 and 1273 K (between 500 and 1000° C.), for example between 873 and 1123 K (between 600 and 850° C.) and a pressure ranging between 1 and 10 bar, for example between 1 and 1.3 bar.

The process conditions of the second step of the method according to the present invention comprise preferably a temperature ranging between 573 and 1473 K (between 300 and 1200° C.) and a pressure ranging between 0.01 and 10 bar. More preferably, the process conditions of the second step of the method according to the present invention comprise a temperature ranging between 973 and 1123 K (between 700 and 850° C.), for example between 973 and 1123 K (between 700 and 850° C.) and a pressure ranging between 1 and 10 bar, for example between 1 and 1.3 bar.

In the first step the first gas stream comprising steam and at least one reductant is brought in contact with the three materials resulting in a first outlet stream, preferably a hydrogen rich outlet stream. In the second step the captured $CO_2$ from the first step is released. The second step preferably results in a second outlet stream comprising a carbon monoxide rich stream. and converted to CO to produce a CO rich outlet stream.

The first outlet stream and the second outlet stream are preferably separated from each other.

The first outlet stream comprises preferably a hydrogen rich stream. The second outlet stream comprises preferably a carbon monoxide rich stream. More preferably, the first outlet stream comprises a hydrogen rich stream and the second outlet stream comprises a carbon monoxide rich stream.

Preferably, the first and second step of the method according to the present invention are repeated periodically. A period can range from second to minutes and is amongst others dependent on the size of the reactor or reactors. A period ranges for example between 10 seconds and 30 minutes or between 30 seconds and 30 minutes. A period is for example 30 seconds, 1 minute, 5 minutes, 10 minutes, 15 minutes, 20 minutes or 30 minutes.

The first and second step of the method according to the present invention can be performed in a single reactor or alternatively in two different reactors, i.e. the first step in a first reactor and the second step in a second reactor.

Preferred methods comprise one or more intermediate step(s), for example in the first step, in the second step or both in the first and the second step. An intermediate step can for example be introduced before or after contacting the first solid material, before or after contacting the second solid material or before or after contacting the $CO_2$ sorbent material, and this in the first step, in the second step or in both the first and the second step.

Intermediate steps comprise for example one or more pretreatment step(s) such as purging, for example purging with a gas, for example with an inert gas. Other intermediate step or steps comprise changing the process conditions, for example the temperature and/or changing the pressure.

The first solid material and the second solid material preferably comprise an oxygen storage material, for example a metal oxide (MeOx). The first solid material and the second solid material comprise for example a metal oxide, respectively a first metal oxide ($Me_1O_x$) and a second metal oxide ($Me_2O_y$). A metal oxide is characterized by a thermodynamic equilibrium partial oxygen pressure ($p_{O_2,eq}$). The thermodynamic equilibrium oxygen partial pressure is dependent on the temperature and pressure.

As mentioned above the first solid material has a first thermodynamic oxygen equilibrium partial pressure referred to as $p1_{O_2,eq}$ and the second solid material has a second thermodynamic equilibrium oxygen partial pressure referred to as $p2_{O_2,eq}$. According to the present invention, the first thermodynamic equilibrium oxygen partial pressure $p1_{O_2,eq}$ is larger than the second thermodynamic equilibrium oxygen partial pressure $p2_{O_2,eq}$ at the process conditions of the first step and at the process conditions of the second step.

Preferably, the first thermodynamic equilibrium oxygen partial pressure $p1_{O_2,eq}$ is at least one order of magnitude larger than the second thermodynamic equilibrium oxygen partial pressure $p2_{O_2,eq}$ at the process conditions of the first step and at the process conditions of the second step. More preferably, the first thermodynamic equilibrium oxygen partial pressure $p1_{O_2,eq}$ is several orders of magnitude larger than the second thermodynamic equilibrium oxygen partial pressure $p2_{O_2,eq}$, for example 2, 3 or 4 orders of magnitude larger.

The thermodynamic equilibrium oxygen partial pressure of a solid material $MeO_x$ can be derived as illustrated below.

The reaction equation for a chemical reaction between molecular oxygen ($O_2$) in gas phase and such solid material ($MeO_x$) can be given generically by equation (1):

$$2MeO_x \rightleftharpoons 2MeO_{x-\delta} + \delta O_2 \tag{1}$$

with $\delta$ an arbitrary number dependent on the solid $MeO_x$.

The heat or enthalpy of this reaction is given by equation (2):

$$\Delta H^0 = \delta H_{O_2}^0 + 2H_{MeO_{x-\delta}}^0 - 2H_{MeO_x}^0 \tag{2}$$

with $H_{O_2}^0$, $H_{MeO_{x-\delta}}^0$, and $S_{MeO_x}^0$ being the standard enthalpies of $O_2$ (gas phase), $MeO_x$ (condensed phase), and $MeO_{x-\delta}$ (condensed phase) in J/mol at a given temperature of the reaction.

The change in entropy of the reaction is given by equation (3):

$$\Delta S^0 = \delta S_{O_2}^0 + 2S_{MeO_{x-\delta}}^0 - 2S_{MeO_x}^0 \tag{3}$$

With $S_{O_2}^0$, $S_{MeO_{x-\delta}}^0$, and $S_{MeO_x}^0$ being the standard entropies of $O_2$ (gas phase), $MeO_x$ (condensed phase), and $MeO_{x-\delta}$ (condensed phase) in J/mol/K at a given temperature of the reaction.

Numerical values of enthalpy and entropy for different substances at standard pressure (101325 Pa) can be found in widely available databases, as for example:

Shen, V. K., et al., eds. *NIST Standard Reference Simulation Website*. NIST Standard Reference Database Number 173. 2020: National Institute of Standards and Technology, Gaithersburg Md., 20899, USA;

Barin, I., in *Thermochemical Data of Pure Substances* (volume 3). 1995. p. 1-1848.

Bale, C. W., et al., *FactSage thermochemical software and databases*, 2010-2016. Calphad, 2016. 54: p. 35-53.

Combining equations (2) and (3), the Gibbs energy of the reaction can be computed. The relation between enthalpy, entropy, and Gibbs energy is given by equation (4).

$$\Delta G^0 = \Delta H^0 - T\Delta S^0 \tag{4}$$

With T the temperature (in K) at which the reaction is carried out.

The thermodynamic equilibrium oxygen partial pressure is calculated using the Gibbs energy of the reaction using equation (5) and (6).

$$a_{O_2,eq} = e^{\frac{-\Delta G^0}{RT}} \tag{5}$$

with $a_{O_2,eq}$ the activity of molecular $O_2$ at the reaction temperature T (in K), R the universal gas constant (8.314 J/mol/K).

For ideal gases, the activity is equal to the partial pressure of the gas. Thus, the thermodynamic equilibrium oxygen partial pressure of the gas in Pa is given by (6)

$$p_{O_2,eq} = a_{O_2,eq} * 101325 \tag{6}$$

As most standard databases record the enthalpy and entropy at the reference standard pressure (101325 Pa), the activity is multiplied by 101325 Pa to yield the thermodynamic equilibrium oxygen partial pressure ($p_{O_2,eq}$) in Pa.

According to the present invention, the first thermodynamic equilibrium oxygen partial pressure $p1_{O_2,eq}$ is larger than the second thermodynamic equilibrium oxygen partial pressure $p_{O_2,eq}$ at the process conditions of the first step and at the process conditions of the second step.

Because of its high thermodynamic equilibrium oxygen partial pressure, the first solid material will oxidize the at least one reductant in the first step under the process conditions of the first step. Possibly, the equilibrium of the reaction of the oxidation of the at least one reductant (for example fuel) is shifted to the right, resulting in a nearly complete or complete oxidation of the at least one reductant in the first step under the process conditions of the first step. The nearly complete or complete reaction is also referred to as an irreversible or nearly irreversible reaction.

Preferably, the first thermodynamic equilibrium oxygen partial pressure $p1_{O_2,eq}$ is at the process conditions higher than necessary for oxidizing CO. The first thermodynamic equilibrium oxygen partial pressure $p1_{O_2,eq}$ is higher than necessary for oxidizing CO even when the molar ratio $CO/CO_2$ is excessively low, for example, lower than 0.1. Consequently, the first solid material can not be oxidized by $CO_2$. Similarly, the first solid material can not be oxidized by $H_2O$.

Preferably, the first solid material is oxidized, for example by the at least one oxidant of the second gas stream, in the second step of the method under the process conditions of the second step. Preferably, the equilibrium of the oxidation of the first solid material by the at least one oxidant is shifted to the right, resulting in a (nearly) complete oxidation of the second solid material (a (nearly) irreversible oxidation of the second solid material).

Preferably, the first solid material has a sufficiently high affinity for the at least one oxidant in the second gas stream because of its equilibrium oxygen partial pressure being at least one order of magnitude higher than that of the equilibrium oxygen partial pressure necessary to reduce the oxidant in the second gas stream or the oxygen partial pressure in the second gas stream if the oxidant is oxygen. This means that the equilibrium of the oxidation reaction of the first solid material is preferably shifted to the right, resulting in a nearly complete or complete oxidation of the first solid material in the second step under the process conditions of the second step. The nearly complete or complete reaction is also referred to as an irreversible or nearly irreversible reaction.

The second solid material oxidizes the at least one reductant of the first gas stream at least partially in the first step and under the process conditions of the first step. Preferably, the second solid material is reversibly reduced, in the first step of the method under the process conditions of the first step. The second solid material is for example reduced by CO in the first step of the method under the process conditions of the first step.

The second thermodynamic equilibrium oxygen partial pressure $p_{O_2,eq}$ is preferably lower than the thermodynamic equilibrium oxygen partial pressure of $CO_2/CO$ mixtures and of $H_2O/H_2$ mixtures having a molar $CO_2/CO$ ratio and/or a molar $H_2O/H_2$ ratio ranging from 0.001 to 100, or from 0.1 to 10. This indicates that the second solid material can be oxidized by $CO_2$ and by $H_2O$.

More preferably, the second solid material is reversibly reduced, for example by CO, in the first step of the method under the process conditions of the first step and the first solid metal is (nearly) irreversibly oxidized, for example by the at least one oxidant in the second gas stream, in the second step of the method under the process conditions of the second step.

Preferably, the first solid material comprises a material comprising nickel, copper, manganese, iron, cobalt, rhodium, gallium or combinations thereof. The first solid material comprises for example: $Ni/NiO$, $Cu/CuO/Cu_2O$, $Co/CoO/Co_3O_4$, $Rh/RhO_2/Rh_2O_3$, $Ga_2O/Ga_2O_3$ or combinations thereof. A particular preferred first solid material comprises $Ni/NiO$. Also mixed oxides, in particular mixed oxides comprising nickel, copper, manganese, iron, cobalt and/or rhodium can be considered. Examples of mixed oxides comprise $NiFe_2O_4$, $CoFe_2O_4$, $MnFe_2O_4$, $Cu_{0.5}Mn_{0.5}Fe_2O_4$, $CuFe_2O_4$, $Co_xMn_yFe_{3-x-y}O_4$ and $FeCo_2O_4$.

Preferably, the second solid material comprises a material comprising iron, cerium, tungsten, lanthanum, strontium, iridium, molybdenum, neodymium, zirconium or combinations thereof. The second solid material comprises for example $Fe/Fe_xO_y$ (for example FeO, $Fe_{0.932}O$, $Fe_3O_4$), $Ce/Ce_xO_y$ (for example $CeO_2$ or $Ce_2O_3$), $Ir/IrO_2$, $MoO_2/Mo$, $W/WO_3$ or $W/WO_2$, $La/La_2O_3$, $Sr/SrO$, $Mn/Mn_2O_3$ or combinations thereof. Also mixed oxides, in particular mixed oxides comprising iron, cerium, tungsten, lanthanum, strontium, molybdenum, neodymium and/or zirconium can be considered. Examples of mixed oxides comprise $Mn_xFe_{1-x}O$ (with a range of x ranging between 0.2 and 0.95), $La_{0.6}Sr_{0.4}FeO_3$, $SmFeO_3$ and $NdFeO_3$.

The second solid material has preferably low or no reactivity with impurities and/or low or no reactivity with nitrogen.

As $CO_2$ sorbent material any $CO_2$ sorbent material known in the art can be considered.

In the first step of the method according to the present invention the $CO_2$ sorbent material predominantly captures the $CO_2$ material under the process conditions of the first step, whereas the $CO_2$ is predominantly released in the second step under the process conditions of the second step. Preferably, the $CO_2$ captured in the first step is released in the second step.

Preferred $CO_2$ sorbent materials comprise an alkali metal or alkaline earth metal or a combination thereof, optionally promoted with an element selected from the group consisting of aluminium, cerium, zirconium or combinations thereof.

Preferred $CO_2$ sorbent materials comprise CaO, optionally promoted with a doping element, preferably a doping element selected from the group consisting of aluminium, cerium, zirconium, magnesium or a combination thereof. The $CO_2$ sorbent material comprises for example CaO optionally promoted with $Al_2O_3$, $CeO_2$, $CaZrO_3$ or combinations thereof. Other preferred $CO_2$ sorbent materials comprise SrO, BaO, MgO, $Li_2ZrO_3$, $Li_4SiO_4$, $Li_6CoO_4$, $Li_5FeO_4$, $Li_6MnO_4$, $Li_2O$ or $LiAlO_4$, optionally promoted.

Preferably, the $CO_2$ sorbent material has low or no selectivity towards $H_2O$ chemisorption.

The first gas stream comprises water (steam) and at least one reductant. It is clear that the first gas stream may comprise a plurality of reductants.

The at least one reductant preferably comprises an organic compound, for example a hydrocarbon, an alcohol, CO, $H_2$ or a mixture thereof. Examples of organic compounds comprise methane, ethane, ethylene, propane, propylene, butane, butylene, methanol, ethanol, propanol, diemethylether, benzene, toluene, tar and naptha.

The first gas stream comprises for example $H_2O$ (steam), $CO_2$ and a carbonaceous fuel. It is clear that industrial gas streams comprising for example $CO_2$ are suitable as first gas stream.

Also biogas is suitable as first gas stream.

The second gas stream comprises at least one oxidant. It is clear that the second gas stream may comprise a plurality of oxidants.

The at least one oxidant comprises for example $O_2$, NO, $NO_2$ or $N_2O$. The second gas stream comprises for example air, optionally air enriched with oxygen or air diluted with one or more (inert) gas(es), for example with $N_2$, He, Ar, Kr or mixtures thereof.

In preferred methods the first gas stream comprises $H_2O$ and a carbonaceous fuel and the second gas stream comprises air.

The method according to the present invention requires that the first and second gas stream are contacting three different materials, i.e. a first solid material, a second solid material and a $CO_2$ sorbent material. The sequence of the contact of the first gas stream with the three materials is however not crucial.

The first gas stream is for example subsequently contacting the first solid material, the second solid material and the $CO_2$ sorbent material in the first step and the second gas stream is for example subsequently contacting the first solid material, the second solid material and the $CO_2$ sorbent material. Other sequences of the materials can be considered as well.

In preferred methods the first gas stream and the second gas stream each subsequently contacts different zones, each zone comprising one material or a combination of different materials.

In a first preferred method the first gas stream is contacting respectively a first zone, a second zone and a third zone and the second gas stream is contacting respectively the first zone, the second zone and the third zone, with the first zone comprising for example a $CO_2$ sorbent material, the second zone comprising for example a first solid material and a $CO_2$ sorbent material and the third zone comprising for example a second solid material and a $CO_2$ sorbent material. Optionally, the reactor may comprise a further zone, for example a fourth zone. In such case the first gas stream is for example contacting respectively a first zone, a second zone, a third zone and a fourth zone and the second gas stream is contacting respectively the first zone, the second zone, the third zone and the fourth zone, with the first zone comprising for example a $CO_2$ sorbent material, the second zone comprising for example a first solid material and a $CO_2$ sorbent material, the third zone comprising for example a second solid material and a $CO_2$ sorbent material and the fourth zone comprising for example a $CO_2$ sorbent material.

In a second preferred method the first gas stream is contacting respectively a first zone and a second zone and the second gas stream is contacting respectively the first zone and the second zone, with the first zone comprising a first solid material and a $CO_2$ sorbent and the second zone comprising a second solid material and a $CO_2$ sorbent material.

It is clear that other configurations can be considered as well.

The first gas stream and the second gas stream can be introduced in the same direction or alternatively in opposite directions. In case the first gas stream and the second gas stream are introduced in the same direction, the first gas stream and the second gas stream are contacting the different zones in the same sequence. In case the first gas stream and the second gas stream are introduced in opposite directions, the first gas stream and the second gas stream are contacting the different zones in opposite sequence.

According to a second aspect of the present invention an installation for producing a hydrogen rich stream and/or a carbon monoxide rich stream is provided. The installation comprises at least one inlet for introducing a first gas stream comprising steam and at least one reductant, at least one inlet for introducing a second gas stream comprising at least one oxidant, at least one outlet for providing a first outlet stream comprising said hydrogen rich stream and at least one second outlet for providing a second outlet stream comprising said carbon monoxide rich stream. The at least one inlet for introducing the first gas stream and the at least one inlet for introducing the second gas stream can be the same. Alternatively, the installation can be provided with different inlets for example a first inlet for introducing a first gas stream and a second inlet for introducing a second gas stream. Similarly, the at least one outlet for providing a first outlet stream and the at least one outlet for providing a second outlet stream can be the same. Alternatively, the installation can be provided with different outlets for example a first outlet for providing a first outlet stream and a second outlet for providing a second outlet stream.

The installation further comprises a first flow path extending from the at least one inlet for introducing said first gas stream to the at least one outlet for providing said first outlet stream, for example from the first inlet to the first outlet, and allowing the first gas stream to contact a first solid material, a second solid material and a $CO_2$ sorbent material and a second flow path extending from the at least one inlet for introducing said first gas stream to the at least one outlet for providing said second gas stream, for example from the second inlet to the second outlet, and allowing the second gas stream to contact the first solid material, the second solid material and the $CO_2$ sorbent material.

The first solid material comprise a steam reforming catalyst. The first solid material has a first thermodynamic equilibrium oxygen partial pressure $p1_{O_2,eq}$ and the second solid material has a second thermodynamic equilibrium oxygen partial pressure $p2_{O_2,eq}$. Preferably, the first thermodynamic equilibrium oxygen partial pressure $p1_{O_2,eq}$ is larger than the second thermodynamic equilibrium oxygen partial pressure $p2_{O_2,eq}$ at a temperature ranging between 573 K and 1473 K and a pressure ranging between 0.01 bar and 100 bar.

The first solid material is in the first flow path and under the process conditions of the first flow path (reversibly or (nearly) irreversibly) oxidizing the at least one reductant and the first solid material is in the second flow path and under the process conditions of the second flow path oxidized, preferably (nearly) irreversibly oxidized, by oxygen, for example by air while not being oxidized by $CO_2$, and preferably not being oxidized by $CO_2$ and by $H_2O$. The second material is in the first flow path and under the process conditions of the first flow path reduced by syngas. The second solid material is in the first flow path and under the process conditions of the first flow path at least partially oxidizing the at least one reductant or syngas. The second solid material is in the second flow path and under the process conditions of the second flow path oxidized by $CO_2$.

The installation according to the present invention may comprise a single reactor whereby the first flow path and the second flow path are provided in this reactor or may comprise two reactors whereby the first flow path is provided in the first reactor and the second flow path in the second reactor.

BRIEF DESCRIPTION OF THE DRAWINGS

The present invention will be discussed in more detail below, with reference to the attached drawings, in which.

DESCRIPTION OF EMBODIMENTS

The present invention will be described with respect to particular embodiments and with reference to certain drawings but the invention is not limited thereto but only by the claims. The drawings are only schematic and are non-limiting. The size of some of the elements in the drawing may be exaggerated and not drawn on scale for illustrative purposes. The dimensions and the relative dimensions do not correspond to actual reductions to practice of the invention.

When referring to the endpoints of a range, the endpoints values of the range are included.

When describing the invention, the terms used are construed in accordance with the following definitions, unless indicated otherwise.

The term 'and/or' when listing two or more items, means that any one of the listed items can by employed by itself or that any combination of two or more of the listed items can be employed.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

For the purpose of the present application, a chemical looping process is defined as a chemical reaction with solid intermediates that is split into multiple sub-reactions and either executed in separate reactors or in alternating manner in a single reactor.

Oxygen storage material is defined as a solid intermediate which can exchange oxygen during a chemical looping process.

A $CO_2$ sorbent is defined as a material, often containing (earth) alkali metal oxides, which can periodically capture and release $CO_2$ by formation and decomposition of metal carbonate, for example (earth) alkali metal carbonate.

A catalyst is defined as a substance or material, which through repeated cycles of elementary steps, accelerates the conversion of reagents into products. Catalysts may comprise homogeneous catalysts, which are in the same phase with the reagents (for example acids and bases, metal complexes, etc.), and heterogeneous catalysts, which are separated from the reactants by an interface (for example metals, metal oxide, etc.).

Organic compound refers to any chemical compound comprising carbon-hydrogen bonds.

Syngas is defined as a (variable) composition mixture of hydrogen and carbon monoxide.

A carbon monoxide rich stream refers to a stream comprising at least 10 mol % of carbon monoxide on an inert-free basis, for example at least 20 mol % of carbon monoxide, at least 30 mol % of carbon monoxide or at least 50 mol % of carbon monoxide.

A hydrogen rich stream refers to a stream comprising at least 50 mol % of hydrogen on a water and inert-free basis, i.e. comprising 50 mol % of hydrogen in the stream excluding water and inert materials. More preferably a hydrogen rich stream refers to a stream comprising at least 60 mol % of hydrogen, or at least 80 mol % of hydrogen.

Figure 1:
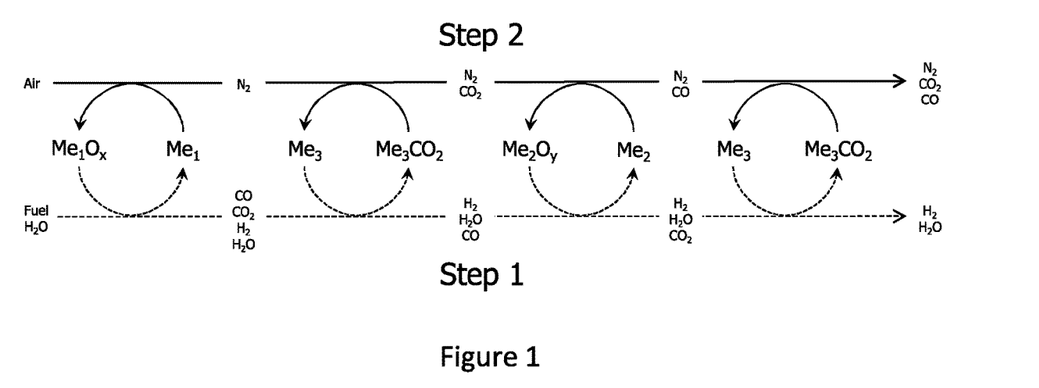
FIG. 1 schematically shows the reaction of a method to produce a hydrogen rich stream and a carbon monoxide rich stream according to the present invention.

FIG. 1 schematically shows the reactions of a method to produce a hydrogen rich stream and/or a carbon monoxide rich stream according to the present invention. The dashed lines in the lower half-circles indicate the reactions in the first step, the lines in the upper half-circles indicate the reactions in the second step.

Figure 2:
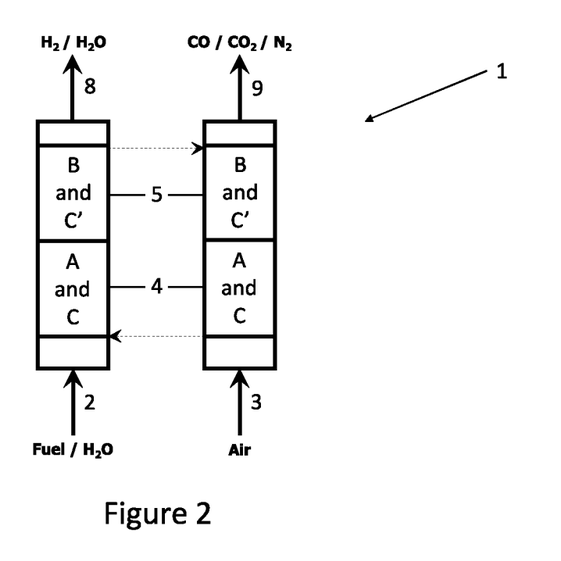
FIG. 2 and FIG. 3 show schematic illustrations of reactors for producing a hydrogen rich stream and a carbon monoxide rich stream according to the present invention.

FIG. 2 shows an example of an installation to produce a hydrogen rich stream and a carbon monoxide rich stream based on the reactions shown in FIG. 1. The installation shown in FIG. 2 comprises a fixed bed reactor 1. It should be clear that other types of reactors such as fluidized bed reactors and moving bed reactors can be considered as well.

The installation 1 comprises at least three different materials, preferably at least three different metal oxides. The installation 1 comprises for example a first solid material A comprising $Me_1O_xMe_1$, a second solid material B comprising $Me_2O_y/Me_2$ and a $CO_2$ sorbent material C comprising $Me_3/Me_3CO_2$. The method comprises preferably two sequential steps, i.e. step 1 and step 2.

The first solid material A comprises for example NiO; the second solid material B comprises for example $Fe_xO_y$ and the $CO_2$ sorbent material C comprises for example CaO, optionally promoted with $Al_2O_3$, $CeO_2$, MgO, or, $ZrO_2$.

In the first step fuel and steam are introduced as first gas stream 2. The first gas stream 2 comprises for example an industrial gas stream and steam. In the second step air is introduced as second gas stream 3.

The reactor 1 shown in FIG. 2 schematically shows a fixed bed reactor 1, having a first zone 4 and a second zone 5. The first zone 4 comprises a first solid material A (for example NiO) and a $CO_2$ sorbent material C (for example CaO, optionally promoted with $Al_2O_3$, $CeO_2$, MgO, or, $ZrO_2$); the second zone 5 comprises the second solid material B (for example $Fe_xO_y$) and a $CO_2$ sorbent material C (for example CaO, optionally promoted with $Al_2O_3$, $CeO_2$, MgO, or, $ZrO_2$). The $CO_2$ sorbent material C' of the second zone 5 can be the same as the $CO_2$ sorbent material C of the first zone 4. Alternatively, the second zone 5 comprises another $CO_2$ sorbent material C' than the first zone 4. The first gas stream 2 is introduced to contact first the first zone 4 and subsequently the second zone 5. The second gas stream 3 is introduced to contact first the second zone 5 and then the first zone 4. The reactor 1 is provided with a first outlet 8 providing a hydrogen rich stream and a second outlet 9 providing a carbon monoxide rich stream.

The following reactions occur in the first step and in the second step, in the different zones represented in FIG. 2:

|  | $1^{st}$ step | $2^{nd}$ step |
|---|---|---|
| $1^{st}$ zone (4) | $3Me_1O_x + x\ CH_4 \rightleftarrows 3\ Me_1 + x\ CO_2 + 2x\ H_2O$ | $Me_3CO_2 \rightleftarrows Me_3 + CO_2$ |
|  | $CH_4 + H_2O \rightleftarrows CO + 3\ H_2$ (catalyzed by $Me_1$) | $Me_1 + x/2\ O_2 \rightarrow Me_1O_x$ |
|  | $CO + H_2O \rightleftarrows CO_2 + H_2$ (catalyzed by $Me_1$) |  |
|  | $Me_3 + CO_2 \rightleftarrows Me_3CO_2$ |  |
| $2^{nd}$ zone (5) | $Me_2O_y + y\ CO \rightleftarrows Me_2 + y\ CO_2$ | $Me_3CO_2 \rightleftarrows Me_3 + CO_2$ |
|  | $Me_3 + CO_2 \rightleftarrows Me_3CO_2$ | $Me_2 + y\ CO_2 \rightleftarrows Me_2O_y + y\ CO$ |
|  | $Me_2O_y + y\ H_2 \rightleftarrows Me_2 + y\ H_2O$ |  |
|  | $CO + H_2O \rightleftarrows = CO_2 + H_2$ |  |

Figure 3:
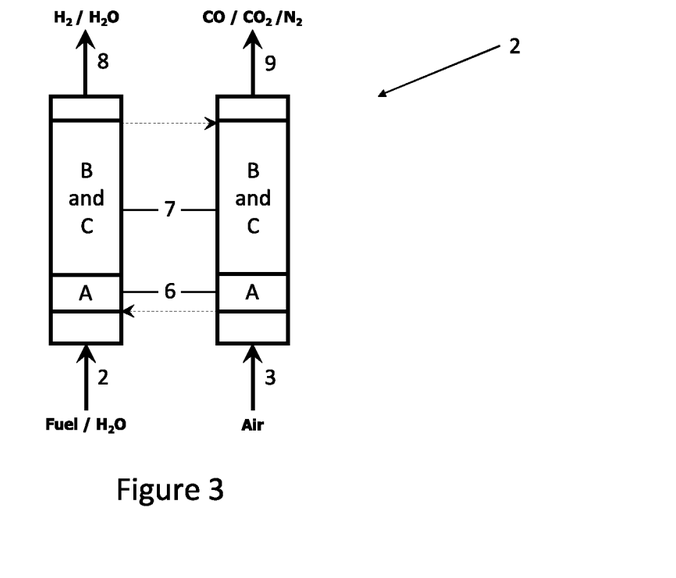

The reactor 1 shown in FIG. 3 has a first zone 6 and a second zone 7. The first zone 6 comprises a first solid material A (for example NiO). The second zone 7 comprises a second solid material B (for example $Fe_xO_y$) and a $CO_2$ sorbent material C (for example CaO, optionally promoted with $Al_2O_3$, $CeO_2$, MgO, or, $ZrO_2$). The first gas stream 2 is introduced to contact first the first zone 6 and subsequently the second zone 7. The second gas stream 3 follows the same flow path and is first contacting the first zone 6 and subsequently the second zone 7. The reactor 1 is provided with a first outlet 8 providing a hydrogen rich stream and a second outlet 9 providing a carbon monoxide rich stream.

The following reactions occur in the first step and in the second step, in the different zones represented in FIG. 3:

|  | $1^{st}$ step | $2^{nd}$ step |
|---|---|---|
| $1^{st}$ zone (6) | $3Me_1O_x + x\ CH_4 \rightleftarrows 3\ Me_1 + x\ CO_2 + 2x\ H_2O$ | $Me_1 + x/2\ O_2 \rightarrow Me_1O_x$ |
|  | $CH_4 + H_2O \rightleftarrows CO + 3\ H_2$ (catalyzed by $Me_1$) |  |
|  | $CO + H_2O \rightleftarrows CO_2 + H_2$ (catalyzed by $Me_1$) |  |
| $2^{nd}$ zone (7) | $Me_2O_y + y\ CO \rightleftarrows Me_2 + y\ CO_2$ | $Me_3CO_2 \rightleftarrows Me_3 + CO_2$ |
|  | $Me_3 + CO_2 \rightleftarrows Me_3CO_2$ | $Me_2 + y\ CO_2 \rightleftarrows Me_2O_y + y\ CO$ |
|  | $Me_2O_y + y\ H_2 \rightleftarrows Me_2 + y\ H_2O$ |  |
|  | $CO + H_2O \rightleftarrows = CO_2 + H_2$ |  |

Experimental Results

A proof of concept experiment involved testing the three materials in a fixed bed reactor enclosed in an electrically heated furnace. The reactor made from quartz glass had an internal diameter of about 7.5 mm. Mass flow controllers by Bronkhorst (EL-Flow for gases and Coriolis for vaporised water) were used for sending known quantities of reactant and/or inert gases into the reactor. For the analysis of the output gas streams from the reactor, a mass spectrometer was used with He as an internal standard gas for quantification purposes.

About 40 mg of a standard Ni-based catalyst was used as first solid material in a first zone of the reactor. This zone was further diluted with a solid diluent $\alpha$-$Al_2O_3$ in a mass ratio of 1:25 to avoid thermal gradients. A second zone of the reactor comprises a mixture of 1 g of stock CaO (purchased from Sigma-Aldrich) and about 0.4 g of a conventional iron-based oxygen carrier. The first gas stream was introduced in the reactor to follow a flow path whereby first the first zone and subsequently the second zone. The flow path of the second stream followed the same order and contacted first the first zone and subsequently the second zone. This experiment's configuration applied the embodiment displayed in FIG. 3.

The first gas stream comprises a mixture of methane or $CH_4$ (fuel) and steam ($H_2O$) in a 1:1 ratio with a further dilution with helium. Helium (an inert gas) was added for practical reasons to allow interpretation of the experimental data. The molar ratio between the three gases $CH_4$, $H_2O$, and He was 1:1:1. The second gas stream comprised He. It is clear that the second gas stream can be amended to comprise an oxidant, for example $O_2$. A fast switching pneumatic valve was used to switch from the first gas stream to the second gas stream. Throughout the experiment, the flow of the input gases fed into the reactor was kept constant at about 2.5 mmol/min.

With the use of three-zone external heating of the fixed bed reactor, a uniform temperature of about 1023 K (750° C.) was maintained. A type K thermocouple was placed inside zone 2 for measuring the temperature of the bed. The pressure was kept constant between 1.1 to 1.3 bar, very close to ambient pressure, and maintained throughout the experiment.

In a typical cycle, the first step (reduction) and the second step (oxidation) were prolonged to about 20 minutes. During the first step (reduction) of the cyclic method, on an $H_2O$ and He-free basis the first outlet stream had the measured output concentration over its duration: 88% $H_2$, 10% unreacted $CH_4$, about 2% CO and less than 0.5% $CO_2$ on a molar basis. For commercial purposes, $H_2O$ in the first outlet stream could easily be removed by condensing it at room temperature and use of He for commercial application would be unnecessary. The presence of unreacted $CH_4$ represents an opportunity to further optimise the results (for example, by adding more steam).

During the second step (oxidation), the second outlet stream had the following molar composition on an He-free basis: 77% $H_2$, 7% $CH_4$, 15% CO, and less than 1% $CO_2$. The presence of $H_2$ and $CH_4$ during oxidation when pure He was fed may be indicative of clogged water in the lines being purged into the reactor by He flow and/or the non-ideal response of the switch from first inlet stream to the second inlet stream. Although the use of He or any other inert is beneficial in the second step, its use may be minimised or almost eliminated by generating heat by the use of an oxidant like air. The very high molar ratio of CO:$CO_2$ (approximately 26) observed in the experiment proves that a CO-rich stream is feasible from this approach. Further optimisation of the experiment could possibly lead to absence of $H_2$ and $CH_4$ and further minimisation of He used in the second outlet stream.

Figure 4:
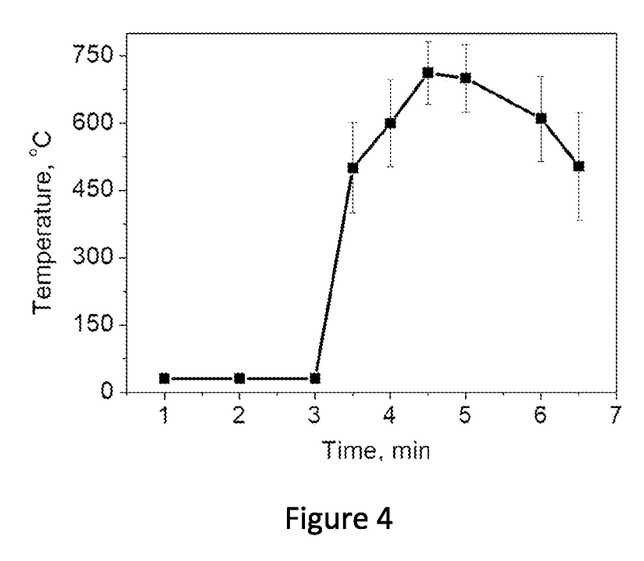
FIG. 4 shows the heat released and the corresponding increase in temperature caused by exposing Ni to $O_2$ as published in "Combined Chemical Looping: New Possibilities for Energy Storage and Conversion", Energy Fuels 2017, 31, 10, 11509-11514.

In another experiment, the phenomenon of heat generation by exposing Ni to $O_2$ as described in "Combined Chemical Looping: New Possibilities for Energy Storage and Conversion", *Energy Fuels* 2017, 31, 10, 11509-11514 was clearly demonstrated. The very high increase in the temperature (of almost 700 K (700° C.)) depicted in FIG. 4 shows the experimental result confirming heat generation.

The thermodynamic equilibrium partial oxygen pressure of the solid materials used in the above mentioned proof of concept experiment Ni-based catalyst (NiO) as first solid material and ($FeO_y$) as second solid material are calculated below.

The total pressure in the experiment was close to the ambient pressure. At the reaction temperature of 1023 K, reactions (11) to (13) should be considered.

(7)

(8)

(9)

The thermodynamic calculations for estimating the thermodynamic equilibrium oxygen partial pressure $p_{O_2,eq_{1023\,K}}$ of the different materials are presented in Table 2. From the values of $p_{O_2,eq_{1023\,K}}$ presented in Table 2, it is clear that the thermodynamic equilibrium oxygen partial pressure of NiO is several orders of magnitude greater than that of $FeO_x$ species, $Fe_3O_4$ and FeO. The higher thermodynamic equilibrium oxygen partial pressure is important to ensure (nearly) complete utilisation of fuel (by the first solid material—NiO in Table 2). Ni formed during the first step is also important to catalyse the reforming and water gas-shift reactions.

TABLE 2

Standard thermodynamic properties of solid components at 1023 K (reaction temperature) used in the proof of concept experiment

| Reaction equation | $\Delta H^0_{1023K} \left(\frac{J}{mol}\right)$ | $\Delta S^0_{1023K} \left(\frac{J}{mol.K}\right)$ | $\Delta G^0_{1023K} \left(\frac{J}{mol}\right)$ | $p_{O_2,\,eq_{1023\,K}}$ (Pa) |
|---|---|---|---|---|
| (11) | 469748 | 171 | 294495 | $9.3 * 10^{-11}$ |
| (12) | 604374 | 217 | 381892 | $3.2 * 10^{-15}$ |
| (13) | 526444 | 128 | 395705 | $6.3 * 10^{-16}$ |

The invention claimed is:

1. A cyclic method of producing a hydrogen rich stream and/or a carbon monoxide rich stream, said method comprises a first step and a second step, wherein;
said first step comprises introducing a first gas stream to contact a first solid material, a first $CO_2$ sorbent material and a second solid material to provide a first outlet stream comprising said hydrogen rich stream, said first gas stream comprising steam and at least one reductant, with the process conditions of said first step comprising a temperature ranging between 573 K and 1473 K and a pressure ranging between 0.1 and 100 bar and;
said second step comprising introducing a second gas stream to contact said first solid material, said first $CO_2$ sorbent material and said second solid material to provide a second outlet stream comprising said carbon monoxide rich stream, said second gas stream comprising at least one oxidant, with the process conditions of said second step comprising a temperature ranging between 573 K and 1473 K and a pressure ranging between 0.01 and 100 bar,
wherein said first outlet stream and said second outlet stream are separated from each other,
wherein said first solid material has a first thermodynamic equilibrium oxygen partial pressure $p1_{O_2,eq}$ and said second solid material has a second thermodynamic equilibrium oxygen partial pressure $p2_{O_2,eq}$, with said first thermodynamic equilibrium oxygen partial pressure $p1_{O_2,eq}$ being larger than said second thermodynamic equilibrium oxygen partial pressure $p2_{O_2,eq}$ at the process conditions of said first step and at the process conditions of said second step,
wherein said first solid material comprises a steam reforming catalyst,
wherein said first solid material is in said first step and under the process conditions of said first step oxidising said at least one reductant to form syngas, said first solid material is in said first step and under the process conditions of said first step catalysing the reaction of said at least one reductant with said steam to form syngas and said first solid material is in said second step and under the process conditions of said second step oxidized by said at least one oxidant while not being oxidized by $CO_2$,
wherein said first $CO_2$ sorbent material is capturing $CO_2$ in said first step and under the process conditions of said first step and said first $CO_2$ sorbent material is releasing $CO_2$, in said second step and under the process conditions of the second step;
and wherein said second solid material is in said first step and under the process conditions of the first step reduced by syngas and said second solid material is in said second step and under the process conditions of said second step oxidized by $CO_2$ to form CO, by $CO_2$ released by said first $CO_2$ sorbent material in said second step.

2. The method according to claim 1, wherein said first thermodynamic equilibrium oxygen partial pressure $p1_{O_2,eq}$ is at least one order of magnitude larger than said second thermodynamic equilibrium oxygen partial pressure $p1_{O_2,eq}$ at the process conditions of said first step and at the process conditions of said second step.

3. The method according to claim 1, wherein said first and said second step are repeated periodically and/or wherein said method comprises one or more intermediate steps.

4. The method according to claim 1, wherein said first solid material is in said second step and under the process conditions of said second step not being oxidized by $CO_2$ and not being oxidized by $H_2O$.

5. The method according to claim 1, wherein said first step further comprises contacting said first gas stream with a second $CO_2$ sorbent material and wherein said second step further comprises contacting said second gas stream with said second $CO_2$ sorbent material.

6. The method according to claim 1, wherein said first solid material comprises a metal selected from a group consisting of nickel, copper, manganese, iron, cobalt, rhodium, gallium, or combinations thereof.

7. The method according to claim 1, wherein said second solid material comprises a metal selected from the group consisting of iron, cerium, tungsten, lanthanum, strontium, iridium, molybdenum, neodymium, zirconium, or combinations thereof.

8. The method according to claim 1, wherein said at least one reductant in said first gas stream comprises an organic compound, an alcohol, CO, $H_2$ or a mixture thereof and/or wherein said at least one oxidant in said second gas stream comprises oxygen or nitrogen oxides.

9. The method according to claim 1, wherein said first $CO_2$ sorbent material comprises an alkali metal or alkaline earth metal.

10. The method according to claim 9 wherem said first $CO_2$ sorbent material is promoted with a doping element selected from the group consisting of aluminium, cerium, zirconium, magnesium or combinations thereof.

11. The method according to claim 5, wherein the said second $CO_2$ sorbent material comprises an alkali metal or alkaline earth metal.

12. The method according to claim 11, wherein said second $CO_2$ sorbent material is promoted with a doping element selected from the group consisting of aluminium, certum, zirconium, magnesium or combinations thereof.

* * * * *